United States Patent [19]
Winskas

[11] Patent Number: 5,083,690
[45] Date of Patent: Jan. 28, 1992

[54] APPARATUS FOR DETACHABLY SECURING AT LEAST ONE GARMENT TO A SUPPORTING ELEMENT

[76] Inventor: Andrew B. Winskas, Star Rte. 1 Box 5261, Tallahassee, Fla. 32310

[21] Appl. No.: 601,458

[22] Filed: Oct. 23, 1990

[51] Int. Cl.⁵ .................. A47G 25/32; A47G 25/34
[52] U.S. Cl. .................................. 223/85; 223/92; 24/599.9; D6/323; D6/324
[58] Field of Search .............. 223/85, 88, 92, 95, 223/DIG. 4; 211/113; 248/308, 305, 340, 231.5; 24/364, 599.9, 599.5; D6/323, 324

[56] References Cited

U.S. PATENT DOCUMENTS

| 456,137 | 7/1891 | Clasy | 24/599.9 X |
|---|---|---|---|
| 688,006 | 12/1901 | Rickman | 24/599.9 |
| 827,206 | 7/1906 | Billman | 24/599.5 |
| 977,716 | 12/1910 | Dovo | 24/599.9 |
| 1,563,660 | 12/1925 | Rubin | 223/93 |
| 1,636,264 | 7/1927 | Weiss | 223/93 |
| 1,705,276 | 3/1929 | Weiss | 223/93 |
| 1,973,376 | 9/1934 | Freedman | 223/62 |
| 2,153,439 | 4/1939 | Stell | 223/93 |
| 2,693,303 | 11/1954 | McGhie | 223/85 |
| 2,877,941 | 3/1959 | Melone | 223/88 |
| 3,831,826 | 8/1974 | Thomas | 211/113 X |
| 3,866,809 | 2/1975 | James | 223/88 |
| 3,966,100 | 6/1976 | Nelson | 223/92 |
| 3,972,455 | 8/1976 | Collins | 223/96 |
| 4,008,835 | 2/1977 | Budzik | 223/85 |
| 4,034,902 | 7/1977 | Grillo | 223/85 |
| 4,155,493 | 5/1979 | Palmaer | 223/85 |
| 4,265,380 | 5/1981 | Webster et al. | 223/85 |
| 4,517,709 | 5/1985 | Arentsen et al. | 24/232 |
| 4,553,294 | 11/1985 | Larsen | 24/289 |
| 4,685,572 | 8/1987 | Jamison | 211/4 |

FOREIGN PATENT DOCUMENTS 113779  5/1942  Sweden ................ 223/85

Primary Examiner—Werner H. Schroeder
Assistant Examiner—Bibhu Mohanty
Attorney, Agent, or Firm—Shlesinger, Arkwright & Garvey

[57] ABSTRACT

The present invention is directed to an apparatus for detachably securing at least one garment to a supporting element. A preferred embodiment of the invention includes a retaining element for retaining at least one garment thereon. A connecting element is operably associated with the retaining element for connecting the retaining element to a supporting element. The connecting means includes a hook element for receiving the supporting member and a closure element operably associated with the hook element for securing the hook element to the supporting member. Detachable fastening means is provided for detachably fastening at least a portion of the closure element to the hook element whereby upon application of a predetermined force on the closure element in a first direction generally towards the retaining means, the portion of the closure element is detached from the hook element. The detachable fastening element includes at least a first rib and at least a first recess for receiving the first rib.

20 Claims, 2 Drawing Sheets

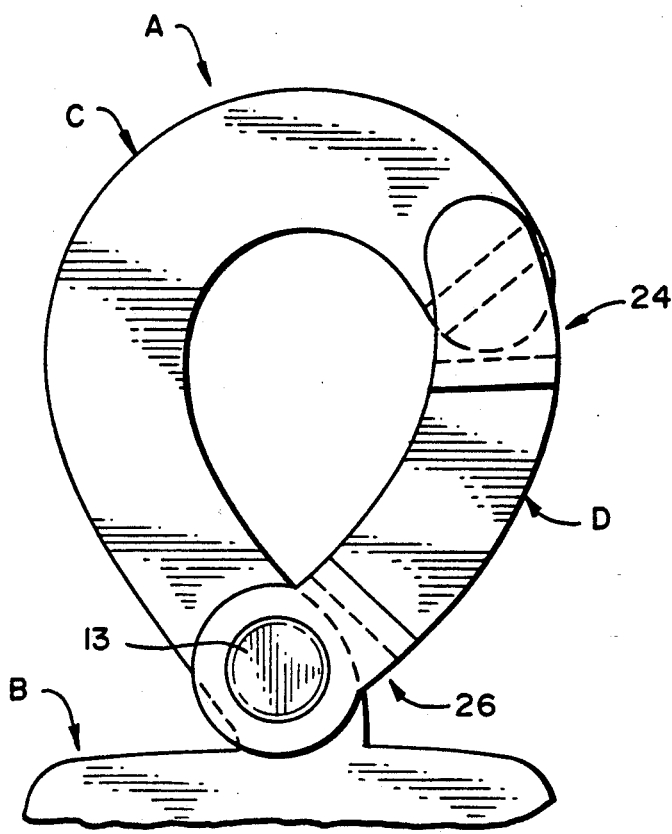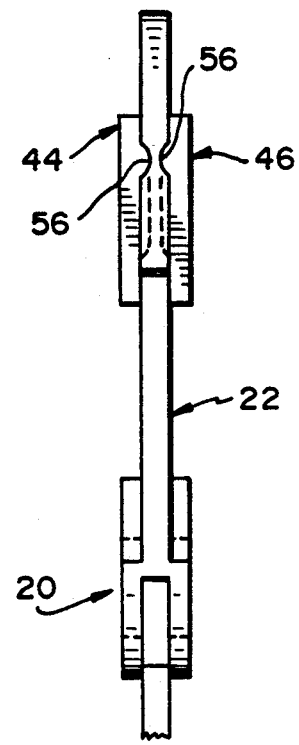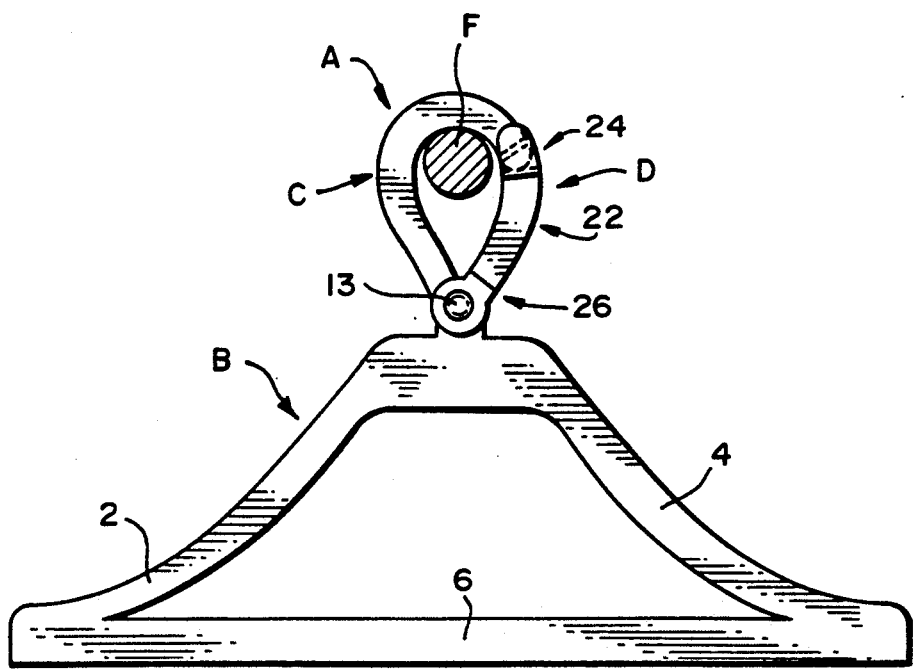

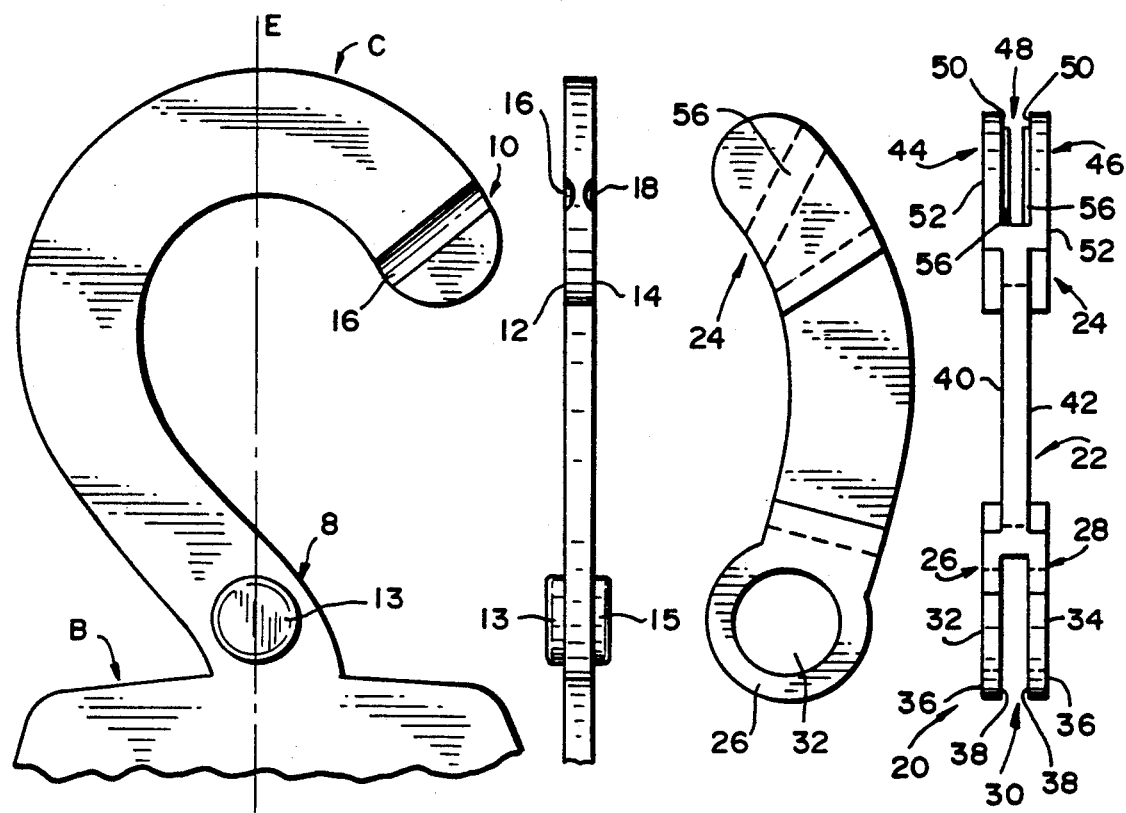
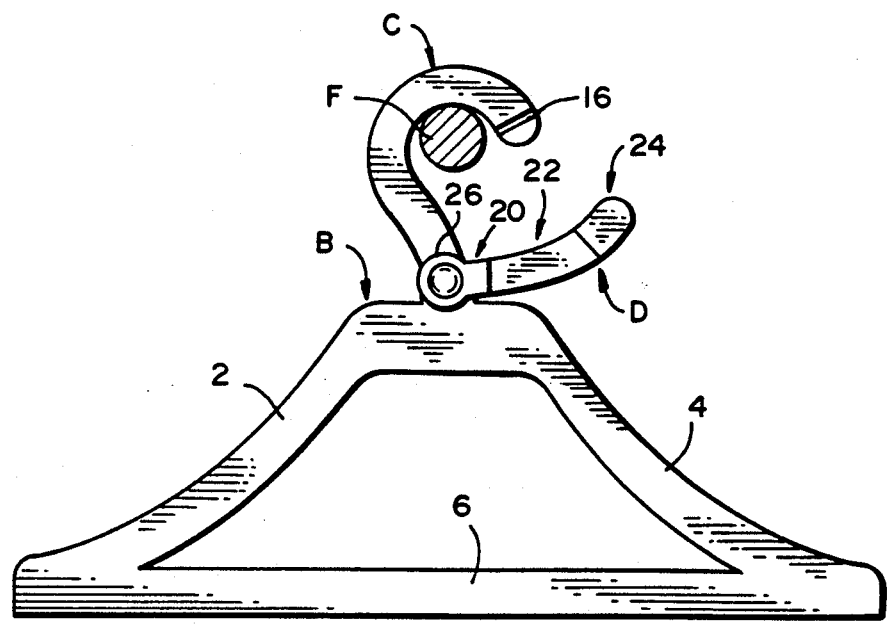

APPARATUS FOR DETACHABLY SECURING AT LEAST ONE GARMENT TO A SUPPORTING ELEMENT

FIELD OF THE INVENTION

The present invention is directed to an apparatus for detachably securing at least one garment to a supporting element. A preferred embodiment of the present invention is directed to a novel and unobvious clothes hanger for supporting clothes from an elevated rod.

BACKGROUND OF THE INVENTION

Conventionally, clothes hangers include a hook element and a pair of legs extending downwardly and outwardly therefrom. A horizontal bar may extend between the lowermost ends of the legs. A garment is positioned over the legs and the hook element is subsequently secured to an elevated supporting rod.

The usefulness of conventional clothes hangers with clothes racks located in airplanes, automobiles, trains, ships, luggage and the like is limited because these clothes racks are commonly jostled about, causing conventional hangers to inadvertently detach therefrom.

A variety of hangers have been proposed which include a hook element and a closure or keeper element operably connected thereto for preventing the hanger from becoming accidentally dislodged from the supporting rod. The following patent documents are directed to clothes hangers of this type: U.S. Pat. Nos. 1,563,660; 1,636,264; 1,705,276; 2,153,439; 2,693,303; 2,877,941; 3,866,809; 3,972,455; 4,008,835; 4,034,902; 4,155,493; 4,265,380; 4,517,709; 4,553,294; and 4,685,571; and Swedish patent document No. 113,779. However, previously proposed locking clothes hangers have a number of disadvantages inherent thereto. For example, when boarding or departing from a plane, train or the like, it is important that an individual be able to quickly secure or remove clothes hangers and the garments suspended therefrom from clothes racks or the like. Moreover, since a passenger boarding or departing from a plane or train is often carrying other packages, it is desirable to be able to hang or remove the clothes hangers with the use of a single hand. Previously known locking hangers are extremely difficult to attach or remove from a coat rack or other supporting element. Further, two hands are normally required to either secure or disengage these clothes hangers from the supporting rack.

In those instances where the coat rack or supporting element remains stationary or is not subject to disruptive forces, it is advantageous to be able to readily remove the closure element therefrom. The closure or keeper elements previously used are either permanently secured to the hanger or are difficult to detach therefrom.

Finally, it is noted that a number of the locking elements previously proposed have required significant modifications to the conventional construction of clothes hangers. Therefore, such locking devices are likely to substantially increase the costs of manufacturing clothes hangers employing the same.

OBJECTS AND SUMMARY OF THE INVENTION

The present invention is directed to a new and improved apparatus for detachably securing at least one garment to a supporting element.

Another object of the present invention is to provide an apparatus for detachably securing at least one garment to a supporting element which includes a retaining means for retaining at least one garment thereon and connecting means operably associated with the retaining means for connecting the retaining means to a support element. The connecting means includes a hook element and a closure element, each having first and second ends. The first end of the closure element is pivotally connected to the hook element adjacent the first end of the hook element. The second end of one of the closure element and the hook element includes a first opening formed therein for receiving the second end of the other of the closure element and the hook element. The first opening extends inwardly from an outermost portion of the second end of the corresponding closure element or hook element. Fastening means are provided for securing the second end of the closure element to the second end of the hook element. The fastening means is disposed adjacent the second end of the hook element and the second end of the closure element.

Among other advantages, the apparatus described above can be readily and easily detached from or secured to a coat rack or other supporting member.

A further object of the present invention is to provide an apparatus for detachably securing at least one garment to a supporting element including a retaining means for retaining one garment thereon and connecting means operably associated with the retaining means for connecting the retaining means to a support element. The connecting means includes a hook element for receiving the support element and a closure element operably associated with the hook element for securing the hook element to the support element. The hook and closure elements each include first and second ends. The first end of the hook element is disposed adjacent the retaining means and the second end of the hook element is removed therefrom The first end of the closure element is connected to the first end of the hook element. Detachable fastening means is provided for detachably fastening at least a portion of the closure element to the hook element whereby upon application of a predetermined force on the closure element in a first direction generally towards the retaining means, the portion of the closure element is detached from the hook element.

The apparatus described above is a significant improvement over previously known locking hangers. Specifically, the apparatus can be readily detached from a clothes rack or similar supporting rod by using only a single hand. This may be accomplished in several ways, one of which is the individual grips the portion of the closure element detachably fastened to the hook element and move the same generally in the direction of the retaining means. Subsequently, the clothes hanger may be freely removed from the clothes rack. Alternatively, an individual need merely grasp a portion of the retaining means and lift it upwardly, causing the support rod to strike the closure element and thereby disconnect one end thereof from the hook element.

Still a further object of the present invention is to provide an apparatus for detachably securing at least one garment to a supporting element which has a retaining means for retaining at least one garment thereon and connecting means operably associated with the retaining means for connecting the retaining means to a supporting element. The connecting means includes a hook element and a closure element each having first and second ends. The first end of the closure element is pivotally connected to the hook element adjacent the first end of the hook element. Detachable fastening means is provided for detachably fastening the second end of the closure element to the hook element adjacent the second end of the hook element. The detachable fastening means includes at least a first rib and at least a first recess for receiving the first rib.

The apparatus described above is advantageous for several reasons one of which is that the detachable fastening means enables an individual to readily attach or remove the apparatus from a supporting member with only one hand.

These objects and advantages as well as others will be readily apparent from the detailed description of the invention set forth below.

In summary, a preferred embodiment of the invention includes a retaining means for retaining at least one garment thereon. A connecting means is operably associated with the retaining means for connecting the retaining means to a supporting element. The connecting means includes a hook element for receiving the supporting member and a closure element operably associated with the hook element for securing the hook element to the supporting member. Detachable fastening means is provided for detachably fastening at least a portion of the closure element to the hook element whereby, upon application of a predetermined force on the closure element in a first direction generally towards the retaining means, the portion of the closure element is detached from the hook element. The detachable fastening means includes at least a first rib and at least a first recess for receiving the first rib.

DETAILED DESCRIPTION OF THE DRAWINGS

FIG. 1 is a fragmentary front elevational view of a preferred embodiment of the present invention.

FIG. 2 is a fragmentary right side elevational view of the embodiment illustrated in FIG. 1.

FIG. 3 is a front elevational view of the preferred embodiment of the present invention connected to a supporting rod.

FIG. 4 is a front elevational view of the hook element of the preferred embodiment of the present invention.

FIG. 5 is a right side elevational view of the hook element illustrated in FIG. 4.

FIG. 6 is a front elevational view of the closure element of the preferred embodiment of the present invention.

FIG. 7 is a right side elevational view of the closure element illustrated in FIG. 6.

FIG. 8 is a front elevational view of the preferred embodiment of the present invention supported on a connecting rod with one end of the closure element detached from the corresponding end of the hook element.

DETAILED DESCRIPTION OF THE INVENTION

The preferred embodiment of the present invention will be described hereinafter with reference to FIGS. 1 through 8.

Referring to FIG. 3, a clothes hanger A includes a garment retaining element B, a hook element C and a closure or keeper element D. The garment retaining element B includes a pair of legs 2 and 4 which extend outwardly and downwardly from hook element C. A bar 6 extends horizontally between the lowermost ends of legs 2 and 4. The garment retaining element B supports at least one garment in the conventional manner.

Referring to FIGS. 4 and 5, the hook element C preferably is integral with the garment retaining element B, and is manufactured from a polymer material such as nylon. The hook element includes first end 8, second end 10, front face 12 and rear face 14. The first end 8 is disposed adjacent the garment retaining element B while the second end 10 is removed therefrom. Substantially cylindrical pins 13 and 15 extend from the front surface 12 and the rear surface 14 adjacent first end 8. The front surface 12 extends substantially parallel to the rear surface 14. Pins 13 and 15 extend substantially perpendicular to the corresponding surfaces 12 and 14, and may be integral therewith. Indentations or recesses 16 and 18 are formed in the front surface 8 and the rear surface 10, respectively. In the preferred embodiment, the recesses 16 and 18 extend the entire width of hook element C and have a substantially arcuate-shaped cross-section. The indentations or recesses 16 and 18 form identical acute angles with the longitudinal axis E of hook element C.

Referring to FIGS. 6 and 7, closure element D includes a first end 20, an intermediate section 22 and a second end 24. The first end 20 includes a pair of legs 26 and 28. Legs 26 and 28 are spaced parallel from each other forming a substantially U-shaped opening 30 therebetween. Apertures 32 and 34 are formed in legs 26 and 28, respectively. Aperture 32 is substantially aligned with aperture 34 along a horizontal axis. Legs 26 and 28 have a substantially circular configuration. The legs 26 and 28 each include an outer surface 36 and an inner surface 38.

The intermediate section 22 extends in an arcuate path and includes a front face 40 and a rear face 42. Front and rear faces 40 and 42 are substantially aligned with corresponding interior surfaces 38 and are inwardly offset from exterior surfaces 36 of legs 26 and 28.

Second end 24 includes legs 44 and 46 which are spaced from each other forming a substantially U-shaped opening 48 therebetween. Legs 44 and 46 each include an interior surface 50 and an exterior surface 52. Interior surfaces 50 extend substantially parallel to exterior surfaces 52. Further, interior surfaces 50 are aligned with corresponding front and rear surfaces 40 and 42, respectively, of intermediate section 22 in the vertical direction. Exterior surfaces 52 are offset outwardly from and extend substantially parallel to corresponding front and rear surfaces 40 and 42. The exterior surface 36 of leg 26 lies in the same plane as exterior surface 52 of leg 44. Similarly, the exterior surface 52 of leg 46 lies in the same plane as exterior surface 36 of leg 28. A rib 56 extends inwardly from each of the interior surfaces 50 of legs 44 and 46. As best seen in FIG. 6, the ribs 56 extend the entire width of the corresponding legs 44 and 46. The ribs 56 have an arcuate configuration corresponding to that of indentions 16 and 18 formed in the second end 10 of hook element C.

The closure element D is formed from a resilient material having a memory. In the preferred embodiment, closure element D is molded from plastic. Referring to FIG. 8, the first end 20 of closure element D is pivotally connected to the first end 8 of hook element C by simply spreading outwardly legs 26 and 28 and aligning openings 32 and 34 formed therein with pins 13 and 15, respectively. Once aligned, the legs 26 and 28 are released to assume an abutting engagement with front and rear faces 12 and 14 of hook element C. As seen in FIG. 8, the closure element D is in the open position, thus permitting the clothes hanger A to be placed on or removed from rod F. To secure the clothes hanger A to rod F, the closure element D is moved upwardly into the closed position, as best seen in FIGS. 1 and 3. In the closed position, closure element D receives the second end 10 of hook element C in opening 48 and indentations 16 and 18 receive corresponding ribs 56.

Although ribs 56 are shown formed on the closure element D and indentations 16 and 18 are formed on hook element C, it will readily appreciated that this arrangement may be reversed. Similarly, the location of pins 13 and 15 and apertures 32 and 34 may be reversed.

The clothes hanger A is a significant improvement over the prior art. In this regard, it is noted that the coat hanger A may be readily and easily secured to or removed from a supporting rod. Specifically, the coat hanger A of the present invention is designed such that movement of only a single element (i.e. the closure element D) is necessary to detach or secure the same to or from a supporting rod. Thus, an individual need only use a single hand to do so. Moreover, an individual may readily detach the coat hanger A from a supporting rod F without touching either the hook element C or the closure element D. Specifically, an individual may grasp the garment retaining element B of the clothes hanger A and lift it upwardly and to the left such that supporting rod F strikes the closure element D detaching the second end 24 from the second end 10 of hook element C.

Although not essential, the leftward movement of the clothes hanger A is desirable so that the direction of the force imparted on closure element D is substantially perpendicular to the direction of extension of indentations 16 and 18. This movement of the clothes hanger A minimizes the force necessary to detach the second end 24 of closure element D from the hook element C. Further, by positioning the indentations 16 and 18 at an acute angle to the longitudinal axis E, a greater vertical or horizontal force is necessary to detach the closure element D, since such forces act on angle other than 90 to the direction of extension of the recesses 16 and 18. Finally, the closure element D may be readily detached from the hook element C when not needed.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

I claim:

1. An apparatus for detachably securing at least one garment to a supporting element, comprising:
   a) retaining means for retaining at least one garment thereon;
   b) connecting means operably associated with said retaining means for connecting said retaining means to a support element;
   c) said connecting means including a untwisted hook element and a closure element each having first and second ends, at least one of said closure element and said hook element being formed as one-piece with said retaining means, wherein said first end of said closure element is pivotally connected to said hook element adjacent said first end of said hook element;
   d) said second end of one of said closure element and said hook element having a first opening formed therein for receiving said second end of the other of said closure element and said hook element, said first opening extending from an outermost portion of said second end of said one of said closure element and said hook element inwardly; and,
   e) fastening means for securing said second end of said closure element to said second end of said hook element, said fastening means being disposed adjacent one of said second end of said hook element and said closure element.

2. An apparatus as in claim 1, wherein:
   a) said first opening is formed in said second end of said closure element.

3. An apparatus as in claim 1, wherein:
   a) said closure element includes an arcuate section extending between said first and second ends thereof; and,
   b) at least a portion of said arcuate section has a substantially rectangularly-shaped cross-section.

4. An apparatus as in claim 1, wherein:
   a) said second end of said closure element includes first and second legs, said first leg is spaced from and extends substantially parallel to said second leg; and,
   b) said first end of said closure element includes first and second legs, said first leg is spaced from and extends substantially parallel to said second leg.

5. An apparatus as in claim 4, wherein:
   a) said first end of said hook element includes first and second support pins; and
   b) each of said first and said second legs of said first end of said closure element include a second opening formed therein for receiving corresponding first and second support pins.

6. An apparatus as in claim 4, wherein:
   a) one of said second end of said closure element and said second end of said hook element includes at least one recess formed therein, the other of said second end of said closure element and said second end of said hook element includes at least one rib extending therefrom.

7. An apparatus as in claim 6, wherein:
   a) said second end of said hook element includes a front surface and a rear surface; and,
   b) a recess is formed in each of said front and rear surfaces of said second end of said hook element, said recesses extend at an acute angle to a longitudinal axis of said hook element.

8. An apparatus as in claim 7, wherein:
   a) a first rib extends from each of said first and second legs of said second end of said closure element.

9. An apparatus as in claim 8, wherein:
a) said rib formed on said first direction leg extends in a first towards said second leg; and
b) said rib formed on said second leg extends in a second direction towards said first leg.

10. An apparatus as in claim 1, wherein:
a) said hook element has a substantially rectangularly-shaped cross-section.

11. An apparatus as in claim 7, wherein:
a) said recesses formed in each of said front and rear surfaces of said hook element have a substantially arcuate configuration.

12. An apparatus as in claim 8, wherein:
a) said first ribs extending from said closure element have a substantially arcuate configuration.

13. An apparatus for detachably securing at least one garment to a supporting element, comprising:
a) retaining means for retaining at least one garment thereon;
b) connecting means operably associated with said retaining means for connecting said retaining means to a supporting element;
c) said connecting means including a untwisted hook element for receiving the support element and a closure element operably associated with said hook element for securing said hook element to the support element;
d) said hook and closure elements having first and second ends, at least one of said hook element and said closure element being formed from one-piece with said retaining means, said first end of said hook element being disposed adjacent said retaining means and said second end of said hook element being removed therefrom, said first end of said closure element being connected to said first end of said hook element; and,
e) releasably fastening means for releasably fastening at least a portion of said closure element to said hook element whereby upon application of a predetermined force on said closure element in a first direction generally towards said retaining means, said portion of said closure element is detached from said hook element.

14. An apparatus as in claim 13, wherein:
a) said first end of said closure element is pivotally connected to said first end of said hook element; and,
b) said second end of one of said closure element and said hook element having a first opening formed therein for receiving said second end of the other of said closure element and said hook element.

15. An apparatus as in claim 14, wherein:
a) said second end of said closure element includes first and second legs, said first leg is spaced from and extends substantially parallel to said second leg; and
b) wherein a rib extends from each of said first and second legs of said closure element.

16. An apparatus as in claim 15, wherein:
a) said second end of said hook element includes a front surface and a rear surface, said front surface extends substantially parallel to said rear surface; and,
b) a recess is formed in each of said front and rear surfaces of said second end of said hook element.

17. An apparatus for detachably securing at least one garment to a supporting element, comprising;
a) retaining means for retaining at least one garment thereon;
b) connecting means operably associated with said retaining means for connecting said retaining means to a supporting element;
c) said connecting means including a hook element and a closure element each having first and second ends, said first end of said closure element is pivotally connected to said hook element adjacent said first end of said hook element; and,
d) releasable fastening means for releasably fastening said second end of said closure element to said hook element adjacent said second end of said hook element, said releasable fastening means including at least a first rib and at least a first recess for receiving said first rib.

18. An apparatus as in claim 17, wherein:
a) said first end of said closure element includes first and second legs, said first leg is spaced from said second leg; and,
b) an opening is formed in each of said first and second legs of said first end of said closure element.

19. An apparatus as in claim 18, wherein:
a) said first end of said hook element includes first and second pins for receiving corresponding openings of said first and second legs of said first end of said closure element.

20. An apparatus as in claim 19, wherein:
a) said first and second legs of said first end of said closure element include inner and outer surfaces;
b) said first and second legs of said second end of said closure element include inner and outer surfaces;
c) said outer surfaces of said first legs of said first and second ends extend in substantially the same plane; and,
d) said outer surfaces of said second legs of said first and second ends extend in substantially the same plane.

* * * * *